United States Patent
Hamdy et al.

(10) Patent No.: US 6,229,998 B1
(45) Date of Patent: May 8, 2001

(54) METHOD AND SYSTEM FOR DETECTING IN-BAND JAMMERS IN A SPREAD SPECTRUM WIRELESS BASE STATION

(75) Inventors: Walid Hamdy; Lennart Mathe; Todd Sutton, all of San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/292,775

(22) Filed: Apr. 12, 1999

(51) Int. Cl.[7] .................................................. H04B 1/06
(52) U.S. Cl. ................................ 455/226.1; 455/234.1; 455/296; 375/346
(58) Field of Search ........................ 455/226.1, 226.2, 455/226.3, 226.4, 234.1, 234.2, 239.1, 245.1, 249.1, 250.1, 254, 296; 375/213, 221, 345, 346, 349, 340, 343

(56) References Cited

U.S. PATENT DOCUMENTS

| | | | |
|---|---|---|---|
| 4,817,198 | 3/1989 | Rinderle | 455/249 |
| 5,036,527 | 7/1991 | Halim et al. | 375/98 |
| 5,093,840 | 3/1992 | Schilling | 375/1 |
| 5,119,508 | 6/1992 | Shamasundara | 455/234.1 |
| 5,134,707 | 7/1992 | Sakashita et al. | 455/3.2 |
| 5,179,353 | 1/1993 | Miyake | 330/129 |
| 5,184,349 | 2/1993 | Riordan | 370/95.3 |
| 5,276,685 | 1/1994 | Kepler et al. | 370/95.3 |
| 5,321,847 | 6/1994 | Johnson, Jr. | 455/63 |
| 5,321,851 | 6/1994 | Sugayama et al. | 455/161.3 |
| 5,331,638 | 7/1994 | Honkasalo et al. | 370/95.1 |
| 5,339,453 | 8/1994 | Sugayama et al. | 455/239.1 |
| 5,369,792 | 11/1994 | Matsumoto et al. | 455/245.1 |
| 5,408,698 | 4/1995 | Serizawa et al. | 455/245.1 |
| 5,448,774 | 9/1995 | Yokozaki et al. | 455/343 |
| 5,493,713 | 2/1996 | Horsfall et al. | 455/236.1 |
| 5,509,030 | 4/1996 | Mortensen | 375/232 |
| 5,548,812 | 8/1996 | Padovani et al. | 455/33.2 |
| 5,555,277 | 9/1996 | Lawrence et al. | 375/346 |
| 5,564,092 | 10/1996 | Grandfield et al. | 455/232.1 |
| 5,564,094 | 10/1996 | Anderson et al. | 455/295 |
| 5,722,061 | 2/1998 | Hutchison, IV et al. | 455/245.1 |
| 5,722,063 | 2/1998 | Peterzell et al. | 455/287 |
| 5,732,341 | 3/1998 | Wheatley, III | 455/234.1 |

FOREIGN PATENT DOCUMENTS

| | | |
|---|---|---|
| 2326783 | 12/1998 | (GB) . |
| 9107037 | 5/1991 | (WO) . |
| 9216063 | 9/1992 | (WO) . |

*Primary Examiner*—Thanh Cong Le
(74) *Attorney, Agent, or Firm*—Philip Wadsworth; Byron Yafuso

(57) ABSTRACT

A method and apparatus for use in a wireless communication base station which provides real-time, continuous detection of in-band jammers with negligible impact on base station cost. In addition to providing jammer detection, the use of the invention to provide improved hardware and system diagnostic capabilities is presented. The jammer detection apparatus utilizes automatic gain control techniques, digital sampling, and digital signal processing to identify anomalous frequency components in the received power spectral density curve. Also described are the use of complex sampling, the complex fast Fourier transform (FFT), and Hanning windows to improve jammer detection capabilities. A method of estimating the location of in-band jammers is described using the computed received power spectral density curves of multiple base stations.

20 Claims, 9 Drawing Sheets

METHOD AND SYSTEM FOR DETECTING IN-BAND JAMMERS IN A SPREAD SPECTRUM WIRELESS BASE STATION

BACKGROUND OF THE INVENTION

I. Field of the Invention

The current invention relates to wireless telecommunications. More particularly, the present invention relates to a novel method and apparatus for real-time detection and location identification of in-band jammers in a wireless base station.

II. Description of the Related Art

Since the introduction of cellular phones to the marketplace, there has been an explosive increase in the usage of portable phones. The frequency spectrum available for wireless phone use, however, did not increase as quickly as the subscriber base. Eventually, the number of subscribers to wireless phone service began to outstrip the capacity of wireless infrastructure using the Advanced Mobile Phone System (AMPS) technology. In response to this imbalance, pioneering companies like Qualcomm developed ways of providing greater call capacity than possible with AMPS without requiring additional frequency spectrum.

In some cases, such as with Code Division Multiple Access (CDMA), this increase in efficiency was accompanied by an increase in complexity of the wireless equipment. By building powerful ASIC and microprocessor technology into both handset and base station equipment, such advanced wireless systems can utilize more powerful digital signal processing and communication system techniques to achieve better signal quality and capacity. Code division multiple access communications systems have been standardized in the United States in Telecommunications Industry Association TIA/EIA/IS95-A, entitled "MOBILE STATION-BASE STATION COMPATIBILITY STANDARD FOR DUAL-MODE WIDEBAND SPREAD SPECTRUM CELLULAR SYSTEM", hereafter referred to as IS-95 and incorporated by reference herein.

Some problems occur in any wireless communication system which can reduce the call-carrying capacity of the spectrum. One such problem is interfering, or jamming, transmissions introduced into the spectrum reserved for use by the wireless system. Transmitters not associated with the wireless system may cause such jamming transmissions by either purposely or inadvertently transmitting an unauthorized signal into the spectrum reserved for the wireless system. While the interference caused by the thermal noise inherent in any wireless system cannot be avoided, jamming signals may be removed, and the resultant lost capacity reclaimed, by turning off the jamming transmitter. Of course, urging the owner of a jamming transmitter to cease transmissions can only occur after the jamming signal is detected. Sometimes documented evidence of jamming is also required.

In a large, complex wireless system, however, it is not always easy to detect jammers. The jamming may occur sporadically, and be difficult to track. Currently, wireless base stations do not typically have the built-in ability to perform spectrum analysis of their received signals. The currently prevalent method of detecting jammers requires that the presence of a jammer first be suspected, by analyzing call capacity and dropped call logs of the system. When a base station is experiencing poor call quality or inexplicably high dropped call rates, a field technician may bring external spectrum analysis equipment to the suspect base station and connect it to the receive antenna system. Such spectrum analyzers are not built into every base station largely due to the amount of increased cost that such a design would require of base stations in an already cost-competitive market. The external spectrum analyzers used for jammer detection generally do not have connections to processors within the wireless system network, so the spectrum analysis data must be collected and analyzed off-line and manually by the field technician. Jamming signals that occur only sporadically may be difficult to detect using such methods, because they must be present when spectrum measurements are being taken to be detected. In addition, even if such a jamming signal is detected using such methods, the field technician gets little information about the location of the jammer from data collected at a single base station.

Most wireless receivers decode signals which occupy a predetermined frequency band. For this reason, the received signal is typically passed through a bandpass filter, which removes signals outside the spectrum reserved for the wireless system. Many receivers in such a wireless system are also equipped with automatic gain control (AGC) modules, which attenuate the incoming signal to better fit within the dynamic range of subsequent receiver circuitry. Such AGC modules attenuate the received signal so that it does not exceed the dynamic range of the subsequent sampling circuits, causing signal distortion commonly referred to as "clipping". In a preferred embodiment of the invention, an AGC formula is used which holds the root-mean-squared (RMS) value of the processed signal to a predetermined constant value. Jamming signals that reside within the wireless system's allocated spectrum, cannot be removed by bandpass filtering. Such in-band jammers will cause AGC circuits to attenuate the received signal more than would occur in the absence of jammers. The result is often a signal whose power spectral density has a shape that may be distinguished from that of a signal which is devoid of in-band jammer components.

In a system using spread-spectrum signals such as CDMA, all subscriber units transmit signals to the base station using the same frequency band and cause mutual interference to each other. In a CDMA system, call capacity is maximized by constraining all subscriber stations to transmitting the lowest power necessary to sustain a predetermined received SNR at the base station. An in-band jammer increases the noise level which every subscriber station must overcome to achieve this SNR, thus forcing every subscriber station to transmit at higher power levels.

An increase in subscriber transmit power causes several problems, including increased drain on batteries, which results in decreased standby and talk time of the subscriber stations. It also causes additional interference to subscribers operating in adjacent base station coverage areas. Subscribers operating in those adjacent base stations respond by increasing their transmit power m an escalating power race.

In addition, subscriber stations near the coverage boundary of a wireless base station may already be transmitting at their maximum level. If such subscriber stations cannot transmit enough power to maintain an acceptable SNR at the base station receiver, the link to that base station will drop. Thus, by increasing the level of transmit power needed to maintain an SNR level near the edge of coverage, a jammer may, in effect, cause shrinkage of a wireless base station's effective reverse-link coverage area.

In many CDMA systems, the forward link radius of the base station is deliberately decreased to match the shrinkage in the reverse link radius which occurs as the result of reverse link loading. Thus, a jamming signal could also result in shrinkage of the wireless base station's effective forward-link coverage area. The balancing of forward and reverse link cell radius is further disclosed U.S. Pat. No. 5,548,812, entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM", assigned to the assignee of the present invention and incorporated by reference herein.

As the number of transmitting subscriber stations increases, jammer detection becomes more difficult. This increased difficulty arises because the jammer represents a smaller percentage of the total received power, making it easier to hide. For this reason, a built-in spectrum analyzer, which can analyze the received spectrum during spontaneous lulls in call activity, is highly desirable.

SUMMARY OF THE INVENTION

The present invention encompasses a method and apparatus for providing real-time, constant detection of in-band jammers with negligible impact on base station cost. Such real-time spectrum analysis is particularly advantageous for use in wideband wireless systems such as CDMA, in which all subscribers use the same transmit frequency band. In addition to providing jammer detection, the present invention enables added hardware and system diagnostic capabilities.

With the advent of advanced technologies like CDMA, increasing amounts of processing power are being designed into modern wireless base stations. While older AMPS base stations could be designed with perhaps a single microprocessor and racks of analog equipment, modern CDMA base stations are being designed with thirty or more microprocessors, including powerful processors with clock speeds in excess of 60 MHz. The present invention capitalizes on the realization that a modern wireless base station may have a surplus of processing power sufficient for performing complicated signal analysis. The base station is designed so that a digital sample stream used in demodulating subscriber station signals is also made available to an existing processor for digital signal processing.

Possible options for producing the necessary digital samples include using just the real-input-data FFT using only data in the I or in the Q branch and performing a complex-input-data FFT using both data in the I and Q branches.

A real-input-data FFT has the benefit that it requires less data and processing per FFT, since if having real data, one can perform "two FFT's almost for the cost of one" with some tricks. The other option has the benefit that it allows inspection of the "whole spectrum", from $F_0-Fs/2$ to $F_0+Fs/2$, where $F_0$ is the CDMA center frequency and Fs is the (baseband) sample rate.

The important question is now: In terms of jammer detection sensitivity, is option A or B better?

Call the jammer power Pj, and thermal+user power for P. The jammer power will distribute equally between the I and Q branches. Thermal noise by its nature, will also distribute equally between I and Q. The user power (=signal from transmitting phones) will also be divided equally between I and Q because the nature of the OQPSK PN spreading.

For a real-input-data FFT, the thermal+user power P/2 is spread over a bandwidth 0 to C/2, whereas in a complex-input-data FFT the thermal+user power P is spread over a bandwidth −C/2 to C/2. (C is the CDMA signal bandwidth of approximately 1.25 MHz). That means that the (in-band) power spectral density will be the same for either technique, with the power spectral density equaling P/C. The jammer detection threshold will be set relative to this "noise floor", and it can be concluded that the jammer detection threshold will be the same for the two cases. But because the jammer power divided equally between the I and the Q branch, the jammer power will be 3 dB less for the real-input-data FFT than in the case of the complex-input-data FFT.

The resulting spectral analysis data is used to identify jamming signals having power spectral density characteristics which are distinguishable from those of legitimate subscriber transmissions in the wireless system's frequency band. By using several base stations located near the jamming transmitter, and by comparing the power spectral densities received at those base stations, the location of the jamming transmitter is estimated.

Additionally, such spectral analysis data is used to detect aberrant receive spectrum characteristics which may indicate a hardware malfunction or failure.

Upon detecting a jamming signal or hardware malfunction, the base station could send an appropriate alarm through the backhaul to a network manager located in the base station controller (BSC). The network manager could correlate alarms received from multiple base stations to estimate the location of a jamming transmitter.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

A wireless system typically has many base stations, which communicate with the subscriber stations using the wireless system's allocated spectrum. Each base station receives analog signals that contain thermal noise and any signals transmitted from nearby subscriber stations. In a wireless system using spread spectrum techniques such as CDMA, all subscribers transmit signals within the same wide reverse-link frequency band. Also residing within this reverse-link frequency band may be undesired interfering, or jamming, signals. If such interfering signals emanate from transmitters not belonging to the wireless system, they may have frequency characteristics which allow them to be distinguished from signals belonging to the wireless system.

Figure 1:
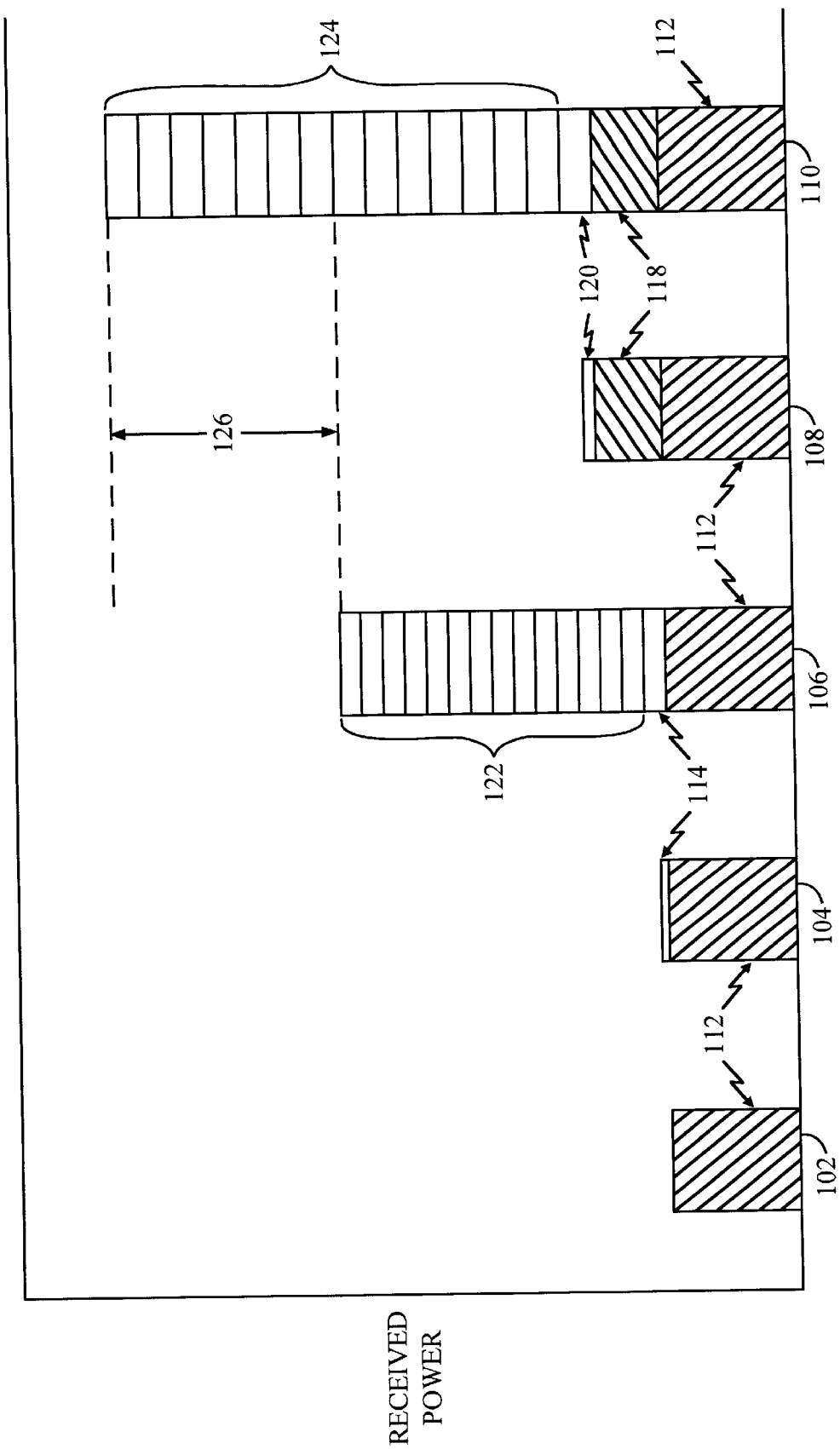
FIG. 1 is a diagram illustrating the levels of received power in a wireless base station for various user and in-band jammer scenarios.

FIG. 1 illustrates the effect an in-band jammer can have on a CDMA wireless system. In the scenarios portrayed, the received SNR of each subscriber is held to 5% (or approximately −13 dB), and the jammer power 118 is half that of the thermal noise power 112. The SNR and jammer power shown in these graphs have been chosen for illustration only, and can vary widely in actual wireless systems. In fact, jammer power seen in actual wireless systems can be much greater than the thermal noise power.

$$SNR = \frac{P_U}{(P_j + P_n) + (N_U - 1)P_U} \quad (1)$$

$$P_U = \frac{SNR(P_j + P_n)}{1 - SNR(N_U - 1)} \quad (2)$$

SNR—Signal-to-noise ratio at the base station receiver $P_u$—Received power from each transmitting subscriber station $P_j$—Received power from an in-band jammer $P_n$—Received power from thermal noise $N_u$—Number of transmitting subscriber stations The relationship between SNR, $P_u$, $P_n$, $P_j$, and $N_u$, is shown in equations (1) and (2). The bar graphs in FIG. 1 show the in-band power occupied by thermal noise, jammers, and subscriber units in the following scenarios:

no transmitting subscriber units, no jammers 102 one transmitting subscriber unit, no jammers 104 fifteen transmitting subscriber units, no jammers 106 one transmitting subscriber unit, with jammers 108 fifteen transmitting subscriber units, with jammers 110

As illustrated in FIG. 1, thermal noise is white noise, whose power is generally constant 112 over frequency. In the scenario depicting one transmitting subscriber unit and no jammers 104, the subscriber station 114 need only transmit enough power to compete with the thermal noise 112. Thus, the SNR is equal to the ratio of subscriber station power 114 to the thermal noise power 112. As other subscriber units begin transmitting to the same base station, each subscriber unit adds to the noise level with which every other subscriber unit must compete. In the scenario having fifteen transmitting subscriber units and no jammers 106, the strength of the interference for any received subscriber signal 114 is computed by adding the thermal noise 112 to the sum of received power of all fourteen other subscribers 122.

In a system where a jammer is present and only a single subscriber station is transmitting 108, that single subscriber unit will be power-controlled to increase its transmit power 120 enough to maintain the desired SNR. When this occurs in a system having a jammer and 15 users 110, all subscriber units must increase their transmit power to compensate for the additional interference. Thus, any subscriber unit 120 must maintain a transmit power level which is proportional to the combined power of the thermal noise 112, the jammer 118, and all other users in the system 124. If some subscriber stations are unable to transmit enough power to sustain the required SNR, this condition may result in dropped calls. Even if the increased power requirements cause no calls to drop, the increase in power 126 causes increased interference to subscriber stations within neighboring coverage areas.

Figure 2:
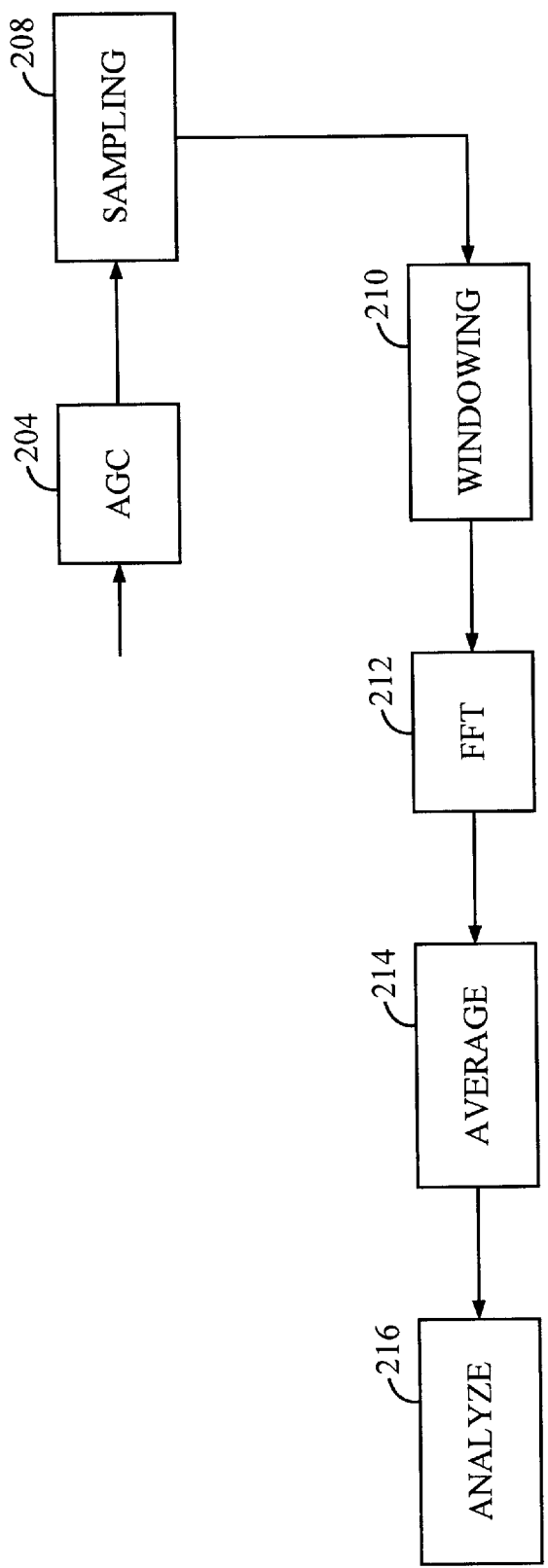
FIG. 2 is a functional block diagram of a process which is a preferred embodiment of the invention.

FIG. 2 depicts a preferred embodiment of a process for detecting in-band jammers using existing hardware in the base station. The analog signals are received by the base station's antenna system, and are bandpass-filtered and downconverted to baseband (steps not shown). Multiple techniques for performing this bandpass-filtering and downconverting are well known in the art. In the preferred embodiment shown in FIG. 2, the signals are passed through an automatic gain control (AGC) module 204, which attenuates the incoming signal so that it resides more optimally within the dynamic range of the sampling circuitry.

The attenuated signal is then sent to a sampler 208, preferably implemented as an analog-to-digital converter, to produce a stream of digital samples. In the preferred embodiment of the invention, the sampler includes cosine and sine digital mixers. The output of the are analog-to-digital converter is sent to the cosine and sine digital mixers, which produce complex samples. This technique, known as complex baseband sampling is well known in the art, and improves subsequent signal analysis by 3 dB.

After sampling, the resultant I and Q sample streams are each multiplied by a windowing function 210 prior to performing a complex fast Fourier transform (FFT) on the I and Q data streams 212. An FFT divides the spectrum into many rectangular sub-bands or bins, each centered at discrete, equally-spaced frequency values. The magnitude of a sinusoidal signal component will be accurately represented in the output of an FFT only if it occurs at the center frequency of one of the bins (also referred to as bin-aligned). If such a signal occurs instead between two adjacent bins (non-bin-aligned), the signal will be detected in both of the adjacent bins, but at lower magnitude in each.

Figure 4:
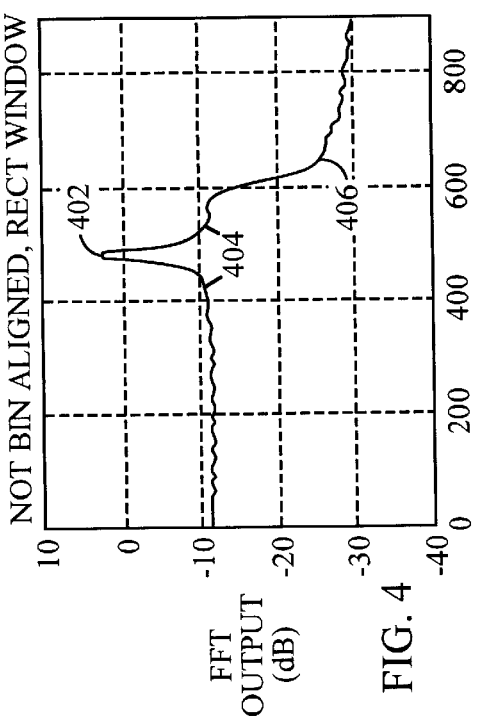
FIG. 4 is an example FFT output of received spectrum containing a non-bin-aligned narrow-band jammer component, utilizing a rectangular window on the sample stream.
Figure 3:
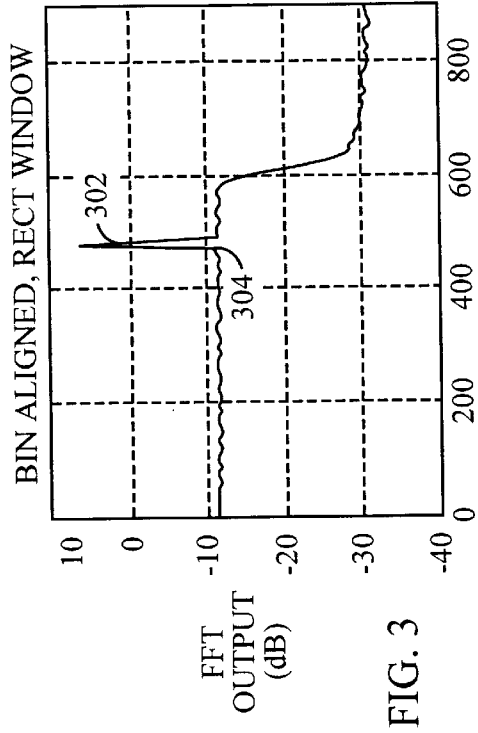
FIG. 3 is an example FFT output of received spectrum containing a bin-aligned narrow-band jammer component, utilizing a rectangular window on the sample stream.

FIG. 3 shows the output of an FFT in which the input samples have not been windowed, and in which the samples contain a sinusoidal signal 302 having a frequency equal to the center frequency of an FFT bin. FIG. 4 shows the output of an FFT in which the input samples have not been windowed, and in which the input signal contains a sinusoidal signal 402 having a frequency equidistant to the center frequencies of two adjacent FFT bins. As evident in the figures, a non-bin-aligned sinusoidal signal causes the FFT to detect frequency components to the adjacent frequency bins in either direction. The result is a frequency spike which is flat at its peak, and has a smaller peak magnitude. In addition, the non-bin-aligned signal causes widening of the base of the detected power spike 404, as well as artifacts in bins which are not adjacent to the signal's center frequency, such as at the edge of the passband 406.

Figure 6:
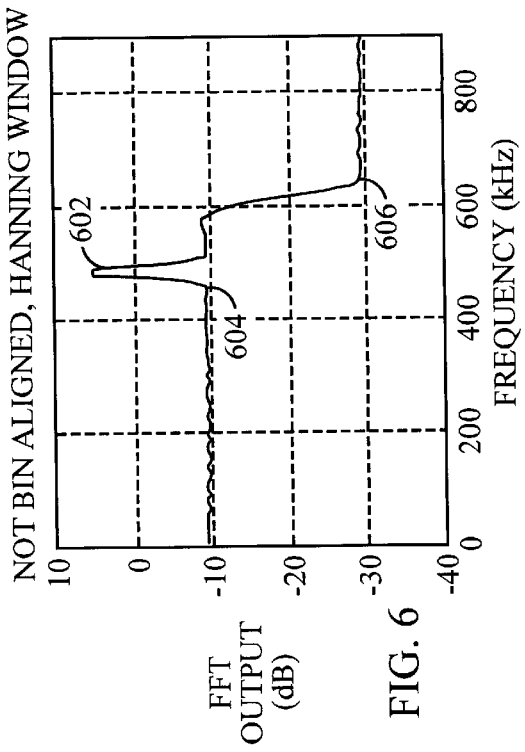
FIG. 6 is an example FFT output of received spectrum containing a non-bin-aligned narrow-band jammer component, utilizing a Hanning window on the sample stream.
Figure 5:
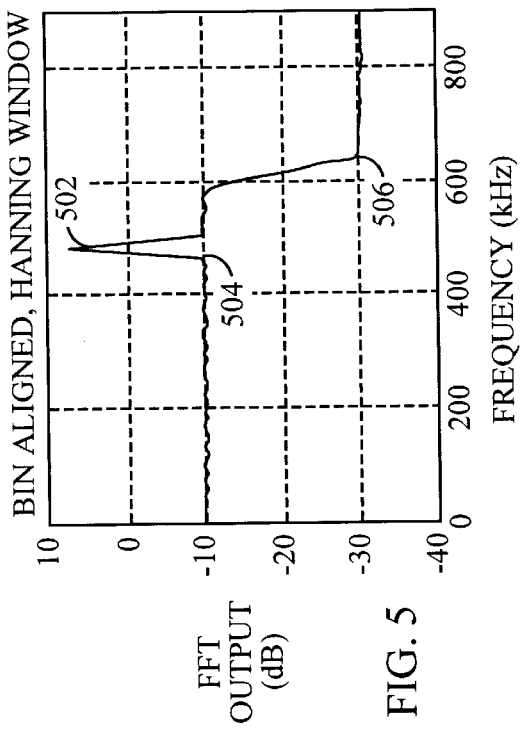
FIG. 5 is an example FFT output of received spectrum containing a bin-aligned narrow-band jammer component, utilizing a Hanning window on the sample stream.

By applying a contouring function, also known as windowing, to the sample stream prior to performing an FFT, the FFT can be made less susceptible to the placement of signal frequencies relative to FFT bins. Several windowing functions, including Hanning windows, are well known in the art. FIG. 5 shows the output of an FFT in which the input samples have been modified using a Hanning window, and in which the samples contain a sinusoidal signal 502 having a frequency equal to the center frequency of an FFT bin. FIG. 6 shows the output of an FFT in which the input samples have been modified using a Hanning window, and in which the samples contains a sinusoidal signal 602 having a frequency equidistant to the center frequencies of two adjacent FFT bins. The magnitudes of the sinusoidal signal components displayed in all four scenarios (FIG. 3–FIG. 6) are equal. Though the use of a Hanning window widens the base of the detected bin-aligned signal 504 compared to that of the rectangular window 304, the shape of the curve stays more consistent when the same signal occurs between two bin frequencies 604. In addition, windowing decreases the difference between peak values of bin-aligned 502 and non-bin-aligned 602 components and greatly decreases the other frequency artifacts seen at the edge of the passband 506 and 606.

Figure 7:
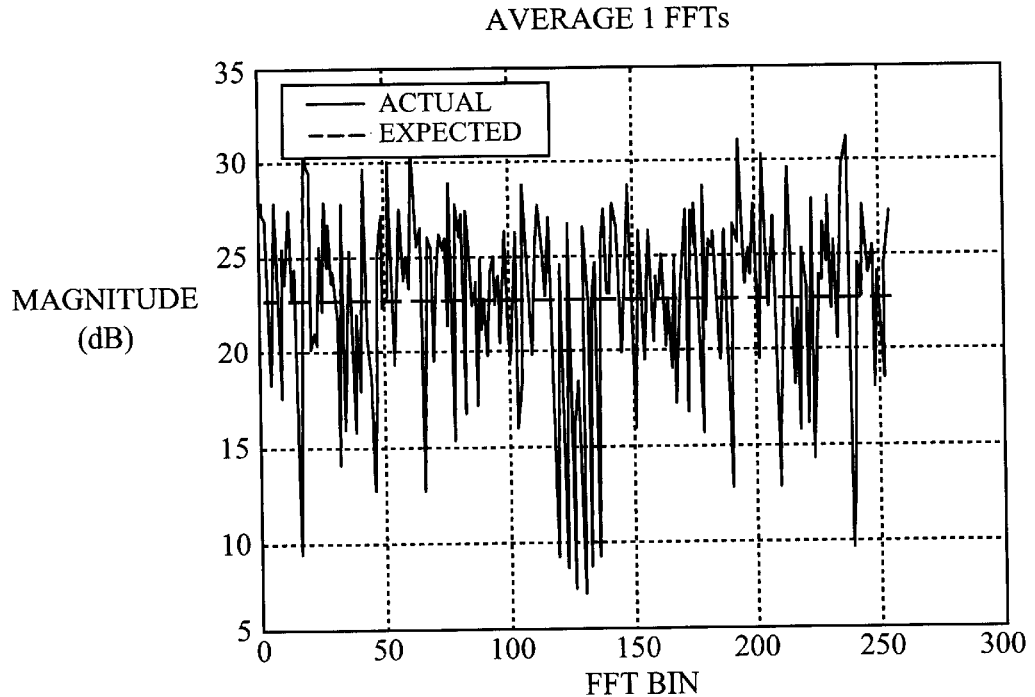
FIG. 7 is a graphical example of the unaveraged FFT as may occur in a wideband wireless base station.
Figure 8:
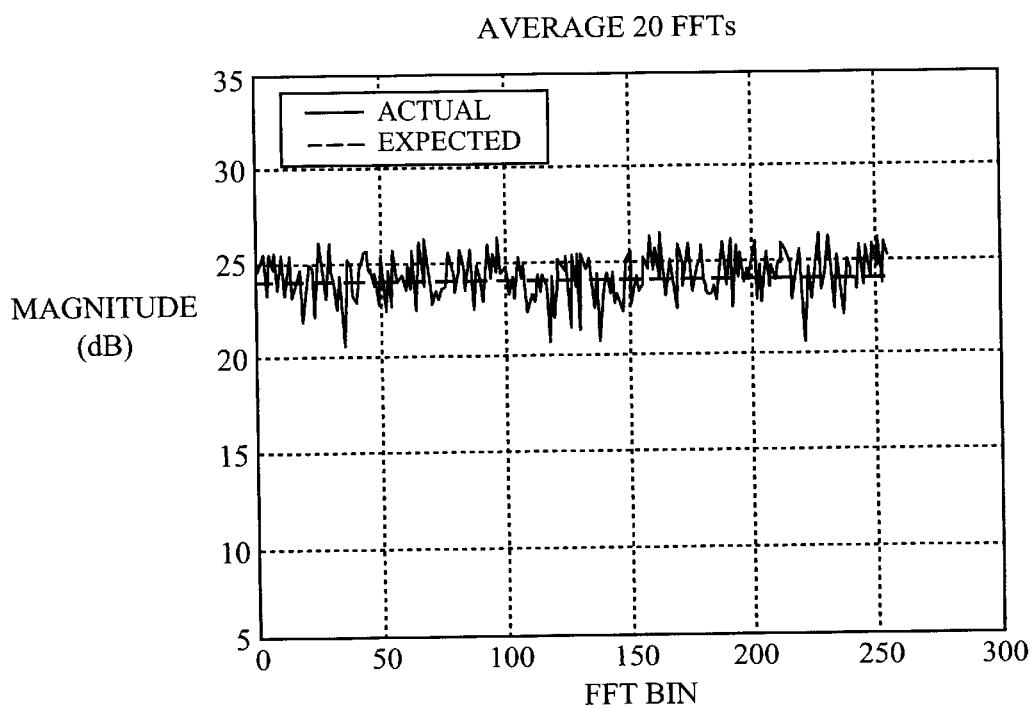
FIG. 8 is a graphical example of the results obtained by averaging twenty sets of FFT output.

Continuing with the description of the preferred embodiment in FIG. 2, the FFT step 212 produces a set of sub-band power measurements, with each measurement representing the power received in an FFT bin. By performing FFT's on multiple sets of digital samples, several sets of sub-band power measurements may be collected and averaged together as shown 212. Averaging the results of multiple FFT's produces a smoother curve and makes subsequent frequency analysis less susceptible to signal noise. Averaging is appropriate in a jammer detection and system diagnostic application, because the input spectrum is assumed to be changing much more slowly than the detected signal noise. FIG. 7 is a graphical representation of an exemplary FFT output. FIG. 8 is a graphical representation of a similar set of 20 exemplary FFT sample sets averaged together.

Figure 9:
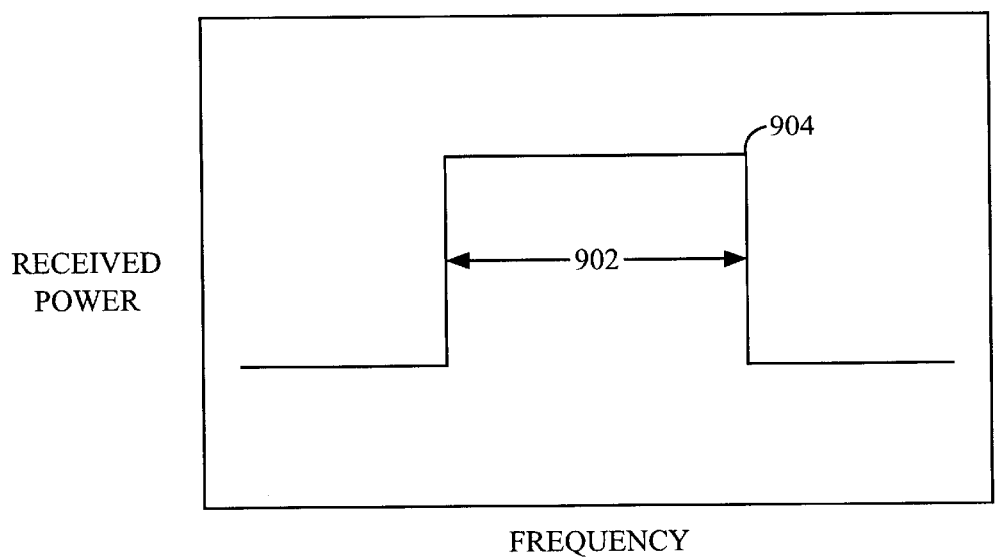
FIG. 9 is an idealized example of the nominal received spectrum processed by a wideband wireless base station in the absence of a jammer.

After averaging multiple sets of FFT output 214, the resulting sub-band power measurements are analyzed 216 to identify any power spectrum anomalies. Since a CDMA wireless base station receives a combination of thermal noise and signals which approximate additive white Gaussian noise (AWGN), the nominal frequency spectrum of the received signal approximates that of bandlimited white noise, as shown in idealized form in FIG. 9. As shown, the nominal spectrum should have little or no energy outside the reverse-link frequency band 902. The power spectral density measured within the reverse-link frequency band is nominally held to a characteristically flat, or constant signal energy floor 904. In a preferred embodiment of the invention, the received signal is attenuated using an AGC module, which causes the signal energy floor to be held to a predictable level for a nominal input signal.

Figure 10:
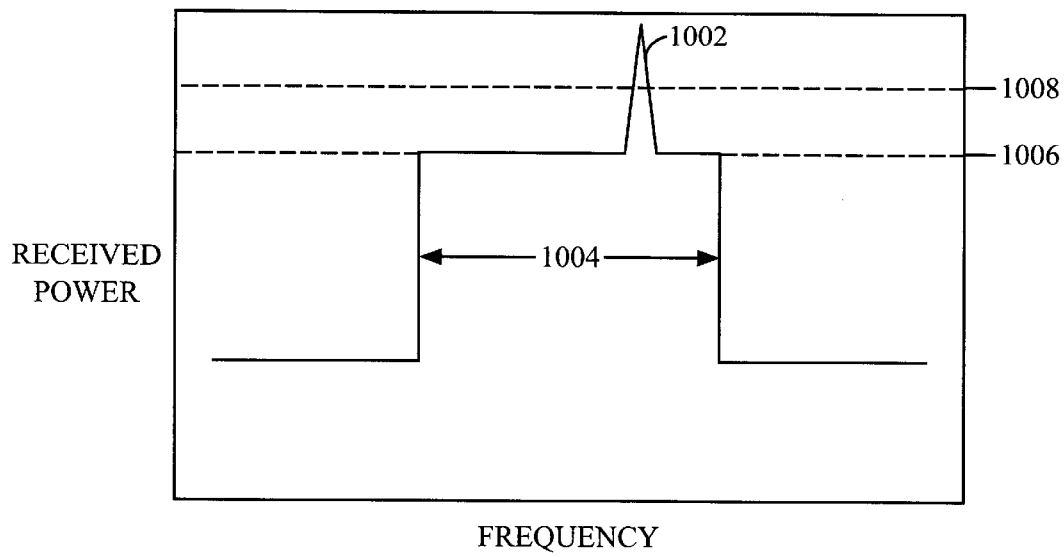
FIG. 10 is an idealized example of the received spectrum, processed by a wideband wireless base station, including power contributed by an in-band jammer.

FIG. 10 shows an idealized graph of the frequency spectrum of a signal containing a narrow-band jammer 1002, which is within the reverse-link frequency band 1004. A narrow-band jammer component 1006 is unlikely to contain enough power to measurably affect the signal floor set by the AGC 1006, so may be detected by looking for any peak which rises above a jammer detection threshold 1008.

Figure 11:
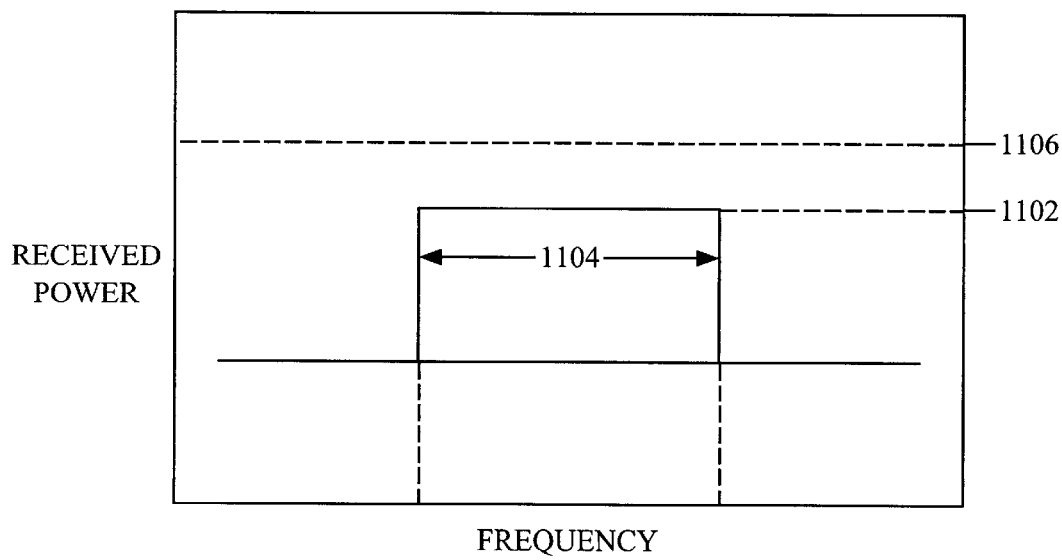
FIG. 11 is an idealized example of the received spectrum processed by a wideband wireless base station having a hardware failure in the base station's AGC module.

The claimed invention could also be used to detect certain hardware problems which alter the shape of the received spectrum. FIG. 11 is an idealized received frequency spectrum graph of a base station which has a failure in its AGC mechanism. As shown, the frequency spectrum might be properly rectangular in shape and contained within the reverse-link frequency passband 1104. But, if the average power level within the passband 1102 is less than the nominal level 1106, an AGC module failure may be indicated. In a scenario not depicted, an AGC failure may also be detected if the average power level within the passband is greater than the nominal value. Insufficient attenuation of the received signal by the AGC module could result in clipping by the sampler, which could cause significant frequency components being detected outside the reverse-link frequency band 1104.

Figure 12:
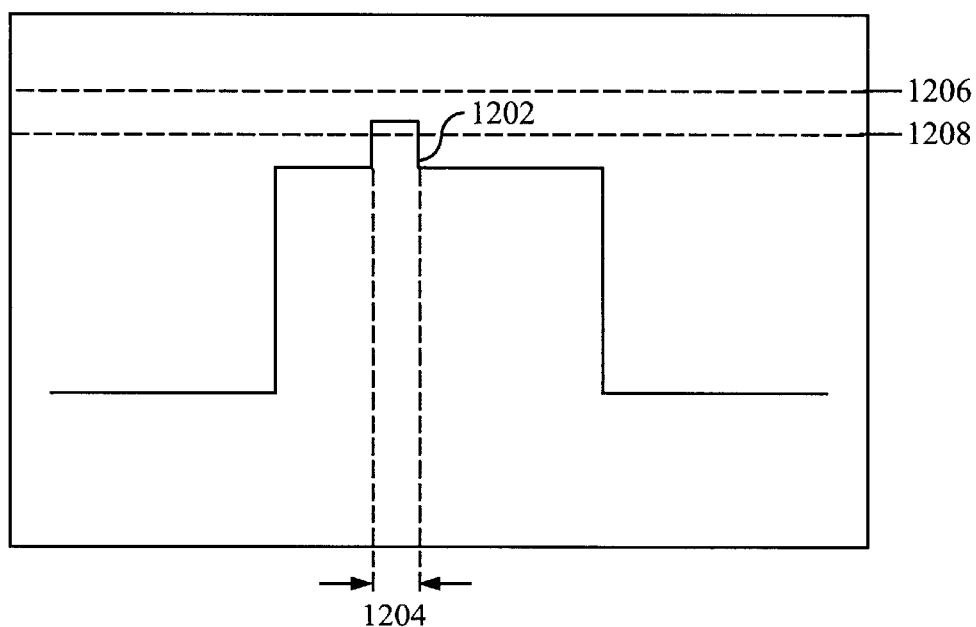
FIG. 12 is an idealized example of the received spectrum containing a jammer.

In the event that a jammer transmits in a relatively wide frequency band, it may contribute significant interference power to the received signal without having a single frequency bin peak which exceeds a nominal narrow-band jammer detection threshold. In such a case, runs of consecutive sub-band power measurements are evaluated as a group and compared against different thresholds which varies according to run length. FIG. 12 depicts an idealized graph of spectrum for a signal having a jammer component 1202 which is spread out over a run of multiple sub-bands 1204. Though no single bin in the graph has power greater than the single-bin threshold 1206, the jammer will still be detectable when the multiple sub-band measurements are evaluated to exceed a multiple-bin threshold 1208.

Figure 13:
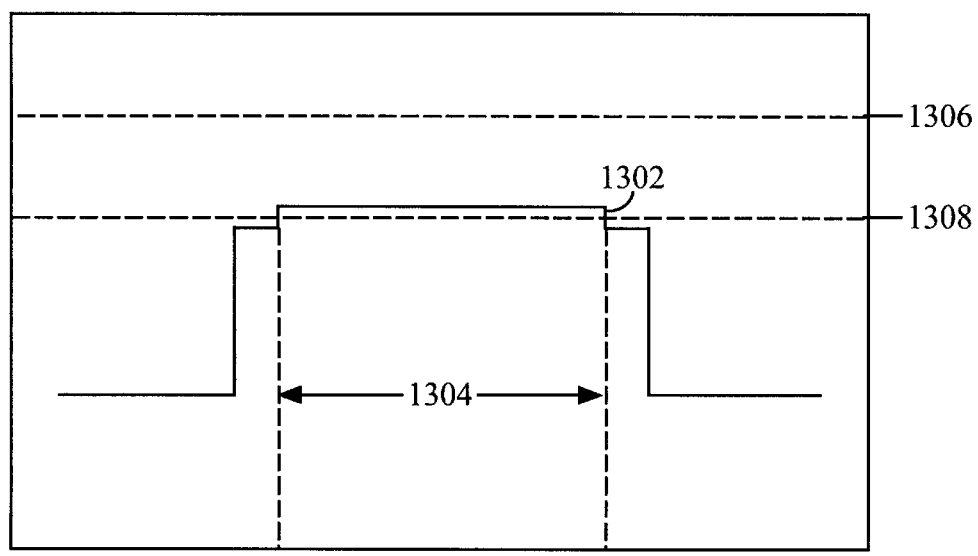
FIG. 13 is an idealized example of the received spectrum containing a wideband jammer.

FIG. 13 depicts another idealized graph of spectrum for a signal having a jammer component 1302 which occupies an even wider frequency band 1304. Again, though such a jammer would not be detected using a single-bin jammer detection threshold 1306, it would still be detectable using a wide-band threshold 1308. In such an approach, groups of adjacent frequency bin values may be averaged together and compared to multiple-bin jammer detection thresholds, according to the number of bins in the group.

Figure 14:
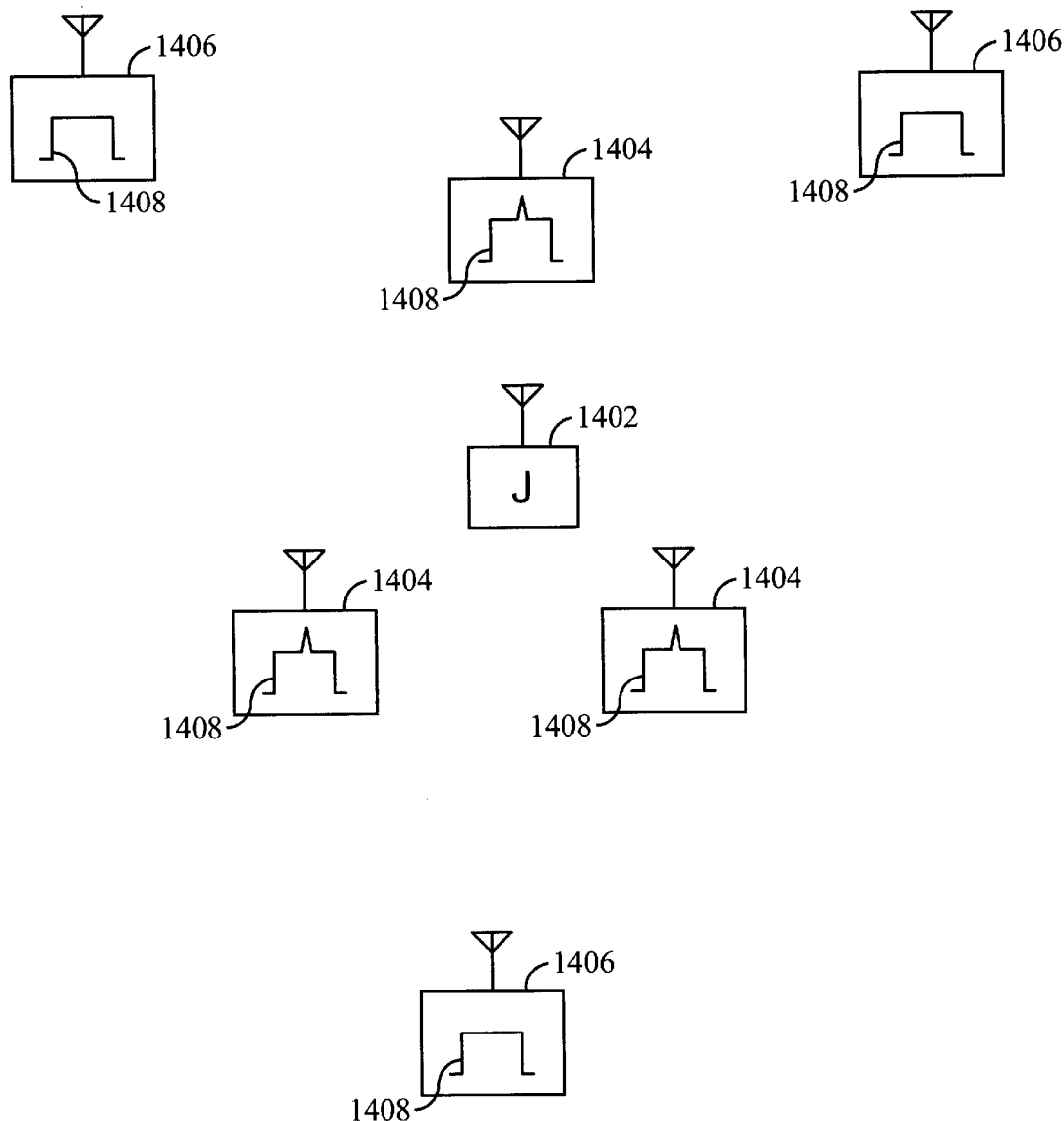
FIG. 14 depicts several base stations of a wireless network and idealized displays of each base station's received spectrum in the presence of an in-band jammer.

In a wireless communication system having multiple base stations with this jamming detection capability, the analysis of reverse-link spectrum from multiple base stations could also allow the estimation of a jamming transmitter's location. FIG. 14 depicts several wireless base stations 1404 and 1406 located at varying distances from a jamming transmitter 1402. Each base station is drawn with an idealized representation of its received spectrum 1408. The jammer is detected at the greatest power levels by the base stations 1404 closest to the jammer 1402. The jammer may be detected at very low levels, or not at all, by base stations 1406 farther away from the jammer 1402. These measurements, along with the knowledge of each base station's location, are analyzed to provide an estimate of the jamming transmitter's location.

Figure 15:
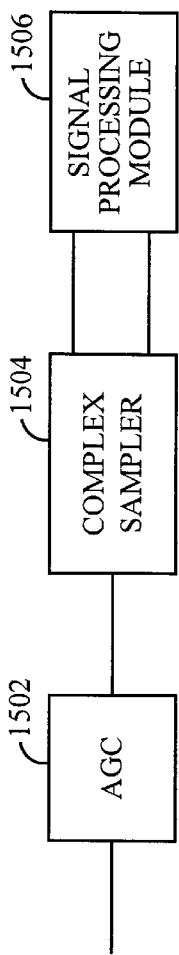
FIG. 15 is an architecture diagram for a preferred embodiment of the invention.

FIG. 15 illustrates, in block diagram form, a preferred embodiment of the base station jammer detection apparatus. The analog signals received by the base station's antenna system (not shown) are processed using bandpass filters (not shown) and downconverter circuitry (not shown). The resulting bandpass-filtered and downconverted signal are then attenuated by an automatic gain control (AGC) module 1502, which adjusts the signal to be within the dynamic range of sampling circuitry. The output of the AGC module 1502 is sent to the sampling module 1504, which sends its input the signal processing module 1506. As mentioned previously, the sampling module 1504 may utilize complex sampling, in which case a complex sample stream would be sent to the signal processing module 1506. One skilled in the art will appreciate that the signal processing module could be implemented in any number of ways, including in software running on a microprocessor, or within an ASIC or programmable logic device.

Figure 16:
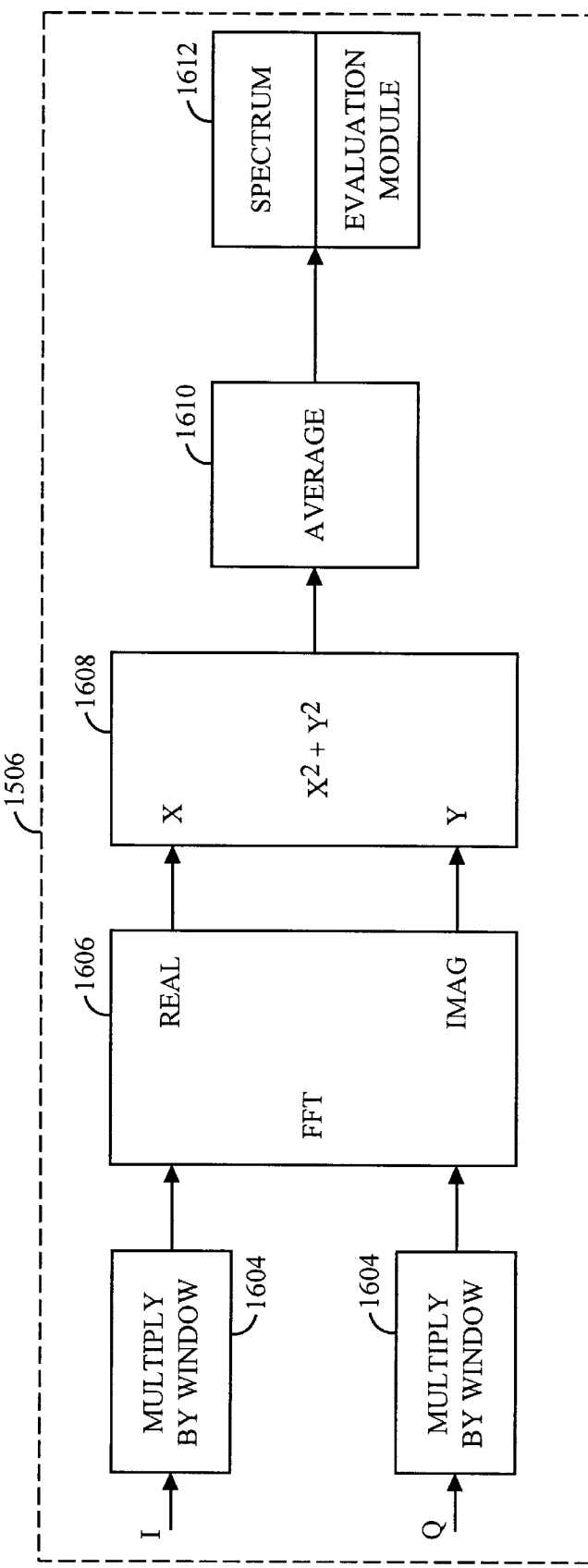
FIG. 16 is a diagram showing sub-modules of the signal processing module of FIG. 15.

FIG. 16 shows an exemplary embodiment of the sub-modules contained within the signal processing module. The complex samples, represented by I and Q, are processed using a Hanning window in the windowing modules 1604. The resultant windowed signal is then processed by the FFT module 1606, which performs a complex FFT and outputs complex sub-band power components. The magnitude of the complex sub-band power components is obtained by summing the squares of the two components in an absolute power module 1608. Several of the resultant sets of sub-band power measurements are collected and averaged in the averaging module 1610 before being analyzed in the spectrum analysis module 1612.

What is claimed is:

1. In a wireless communication base station, a method for detecting in-band interfering signals comprising the steps of:
   (a) performing downconversion and bandpass-filtering of a received analog signal to produce a downconverted bandpass-filtered analog signal which resides approximately within a predetermined reverse-link frequency band;
   (b) performing automatic gain control of said downconverted bandpass-filtered analog signal to produce a first gain-controlled signal whose RMS amplitude is approximately equal to a predetermined value;
   (c) performing analog-to-digital conversion of said first gain-controlled signal to create a stream of digital samples;
   (d) performing analysis of said stream of digital samples to create a first set of sub-band power measurements corresponding to the received power associated with adjacent frequency sub-bands, each sub-band representing a fraction of a predetermined spectrum analysis band, said spectrum analysis band representing a superset of said reverse-link frequency band; and
   (e) performing spectrum evaluation which identifies a group of one or more adjacent sub-band power measurements which exceed a predetermined threshold.

2. The method of claim 1 in which said analysis is performed utilizing a Fast Fourier Transform (FFT).

3. The method of claim 1 further comprising performing windowing on said stream of digital samples prior to performing said analysis.

4. The method of claim 3 in which said windowing utilizes a Hanning window.

5. The method of claim 1 in which said predetermined threshold varies according to the number of said sub-band power measurements in said group.

6. The method of claim 1 further comprising the step of repeating said analysis multiple times over different portions of said stream to produce multiple sets of sub-band power measurements and averaging said multiple sets to produce a second set of sub-band power measurements for use in performing said identification and evaluation.

7. The method of claim 6 wherein said predetermined threshold varies according to the number of said multiple sets averaged.

8. The method of claim 1 wherein said evaluation further comprises the step of identifying any group of one or more sub-band power measurements which are inside said reverse-link frequency band, and are less than a predetermined minimum floor threshold.

9. The method of claim 1 wherein said evaluation further comprises the step of identifying any group of one or more sub-band power measurements which are outside said reverse-link frequency band, and are greater than a predetermined out-of-band threshold.

10. The method of claim 1 wherein said analog-to-digital conversion further comprises performing complex sampling to produce said stream of digital samples.

11. A wireless communication system base station comprising:
   an automatic gain control module for attenuating a downconverted bandpass-filtered signal and producing a gain-controlled signal having an RMS magnitude which is approximately equal to a predetermined value;
   an analog-to-digital converter, operably connected to said automatic gain control module, or processing the output of said gain-controlled signal to produce a stream of digital samples;
   a signal processing module for processing said stream of digital samples, operably connected to said analog to digital converter, said signal processing module comprising:
   a time to frequency converter module for analyzing a portion of said stream to produce received sub-band power measurements corresponding to adjacent, frequency sub-bands, each sub-band representing a fraction the transmit frequency band;
   a spectrum evaluation module for identifying any group of one or more adjacent sub-band power measurements which exceed a predetermined threshold.

12. The apparatus of claim 11 wherein said time to frequency converter module utilizes a Fast Fourier Transform (FFT).

13. The apparatus of claim 11 wherein said spectrum analyzer further comprises a windowing module for performing non-rectangular windowing of said stream of digital samples.

14. The apparatus of claim 13 in which said windowing module utilizes a Hanning window.

15. The apparatus of claim 11 in which said predetermined threshold varies according to the number of said sub-band power measurements in said group.

16. The apparatus of claim 11 wherein said spectrum analyzer further comprises a sub-band power averaging module for averaging multiple sets of sub-band power measurements to produce a second set of sub-band power measurements for use by said spectrum evaluation module.

17. The apparatus of claim 16 wherein said predetermined threshold varies according to the number of said multiple sets averaged.

18. The apparatus of claim 16 wherein said analog-to-digital converter further comprises means for performing complex sampling, and wherein said stream of digital samples are complex digital samples, and wherein said time to frequency converter module utilizes Fast Fourier Transform (FFT), and wherein said signal processing module further comprises an absolute power module, operably connected between said time to frequency converter module and said averaging module, said received sub-band power measurements being produced by said absolute power module.

19. The apparatus of claim 11 wherein said spectrum evaluation module also identifies any group of one or more sub-band power measurements which are inside said reverse-link frequency band, and are less than a predetermined minimum floor threshold.

20. The apparatus of claim 11 wherein said spectrum evaluation module also identifies any group of one or more sub-band power measurements which are outside said reverse-link frequency band, and are greater than a predetermined out-of-band threshold.

* * * * *